United States Patent

[11] 3,621,185

[72] Inventors William F. Iceland
Los Alamitos;
Donald R. Lien, La Habra, both of Calif.
[21] Appl. No. 823,634
[22] Filed May 12, 1969
[45] Patented Nov. 16, 1971
[73] Assignee North American Rockwell Corporation

[54] WELDING SYSTEM
2 Claims, 1 Drawing Fig.

[52] U.S. Cl..................................................... 219/130,
219/131 F
[51] Int. Cl..................................................... B23k 9/00
[50] Field of Search........................................... 219/131,
130; 314/62, 63, 68

[56] References Cited
UNITED STATES PATENTS
| | | | |
|---|---|---|---|
| 1,615,687 | 1/1927 | Eschholz...................... | 314/64 |
| 2,445,789 | 7/1948 | Lobosco...................... | 314/64 |
| 2,636,102 | 4/1953 | Lobosco...................... | 219/131 F |

Primary Examiner—J. V. Truhe
Assistant Examiner—George A. Montanye
Attorneys—William R. Lane, Allan Rothenberg and Sidney Magnes ABSTRACT: The invention pertains to MIG-welding apparatus wherein the actual speed of a welding wire is compared with the feeding rate of the feeding means and conditions at the arc, to compensate for slippage between the feeding means and welding wire thereby improving the response to changes in welding conditions.

PATENTED NOV 16 1971
3,621,185
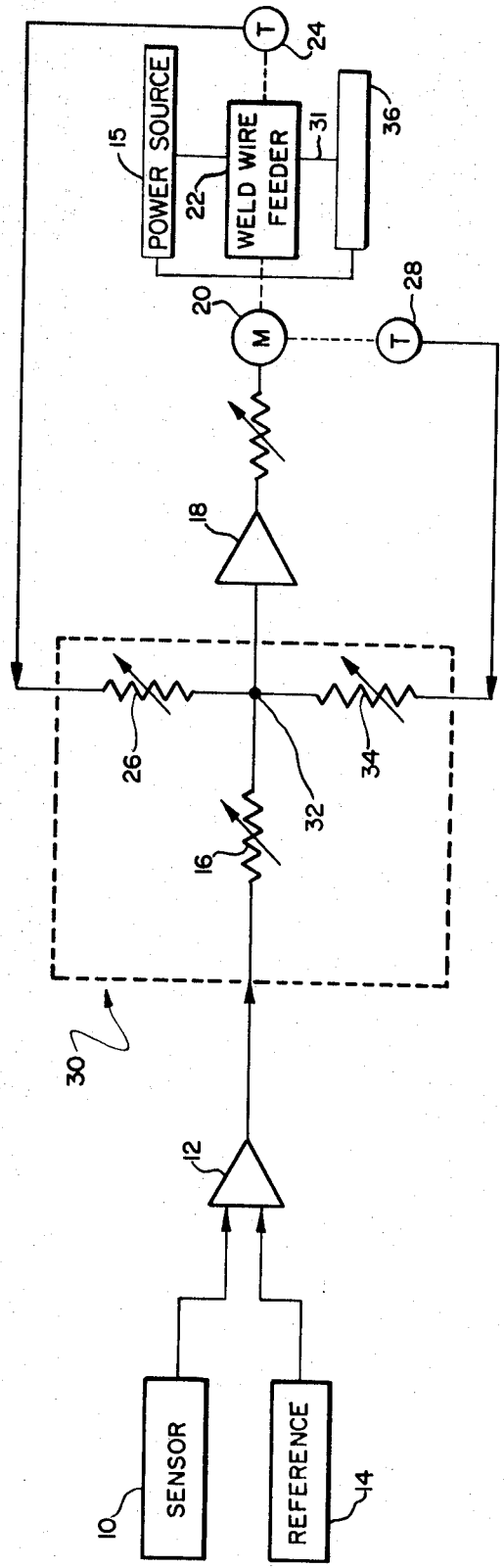
INVENTOR.
WILLIAM F. ICELAND
BY   DONALD R. LIEN
Sidney Magnes

WELDING SYSTEM

BACKGROUND

In electric arc-welding, two of the most widely used techniques are the Tungsten-electrode/Inert-Gas (TIG) technique, and the Metallic-electrode/Inert-Gas (MIG) technique. In each of these techniques, an electric arc is formed in the welding area between an electrode and a workpiece; and this welding area is submerged in an atmosphere of inert gas, in order to minimize contamination.

In the TIG system, the electrode is ordinarily a tungsten rod that serves as a source of electrons for the arc; the tungsten rod does not enter into the actual welding operation, and is not consumed. On the other hand, in the MIG technique, the electrode is a "weld-wire" that is constantly fed forward into the arc; and is melted by the heat from the arc to form a "weld-puddle"—the molten material of the weld-wire thus entering into the composition of the solidified weld-puddle or "weld-bead."

It is well-known that automatic-welding operations use a plurality of weld-control signals; various types of control signals being produced by the arc length, the arc current, the heat generated by the arc, the radiations emitted by the weld-puddle, etc. Selected weld-control signals are then applied to the welding apparatus, in order to compensate for changes of the welding operation. Ordinarily, the weld-control signal controls the magnitude of the welding current.

The welding current of a MIG welding operation is controlled as follows. It should be recalled that in MIG welding the electrode is a reel of weld-wire; the electric arc forming between the end of the weld-wire and the workpiece. Since the end of the weld-wire melts, there is a given weld-wire "burn back;" and the weld-wire must be fed forward at this rate, in order to sustain the welding arc. If a "positive" control signal calls for a shorter arc, or more welding current, or more heat, etc., the weld-wire must be fed forward at a faster rate; whereas a "negative" control signal may require a slower weld-wire feed rate.

Prior art weld-control signals performed their function adequately; but completely overlooked a problem that is peculiar to MIG system. As indicated above, the weld-wire must be fed from a relatively high-inertia reel through a guide channel to the welding area—the weld-wire feeding arrangement generally comprising a gear drive, a friction drive, a rack and gear drive, or the like. Very often, due to friction, surface condition, wire-kinks, etc., the weld-wire tends to bind momentarily in its guide channel; and this, of course, degrades the welding operation. At other times, due to inertia, etc., the weld-wire may feed too fast; and this too degrades the welding operation. Unfortunately, an appreciable time interval may pass before this degradation produces a compensating weld-control signal; and, at that time, the weld-control signal may try to compensate for a welding condition that is now badly out of control.

OBJECTS AND DRAWINGS

It is therefore an object of the present invention to provide an improved welding system.

The attainment of this object and others will be realized from the following detailed description, taken in conjunction with the drawing which shows a block/schematic illustration of apparatus for practicing the invention.

SYNOPSIS

Briefly stated, the present disclosure is directed to the MIG-welding technique; and minimizes the effects of the variables that enter into the feeding of the weld-wire. The disclosed apparatus senses the instantaneous feed rate of the weld-wire; senses rotational acceleration/deceleration of the motor that is driving the weld-wire; provides suitable compensation signals; and then composites these signals with the weld control signal, to control the actual welding operation.

DISCLOSURE

The basic inventive concept will be understood from the drawing. This shows a MIG-type welding operation wherein sensor 10 (which may be responsive to infrared radiations) produces a sensor signal that is applied to a unit such as a differential amplifier 12. Simultaneously, a reference source 14 produces a reference signal that is also applied to differential amplifier 12. This type of amplifier amplifies the difference between the input signals; and the output of amplifier 12 is an "error signal" whose magnitude indicates whether the welding operation is satisfactory. The error signal may have its magnitude adjusted by a variable-scaling resistance 16 or by another amplifier.

Assume for the moment that the welding operation is proceeding satisfactorily. Under this assumed condition, the sensor signal from unit 10 is balanced against the reference signal from reference source 14; and no error signal is produced. This zero-magnitude error signal is applied to a power amplifier 18 that produces an output that is strong enough to operate a motor 20; this in turn operating a weld-wire feeding unit 22 that feeds the weld-wire 31, supplied with power from source 15, from a reel toward workpiece 36 into the welding arc. Weld-wire feeds are well known, and generally comprise a variable-speed motor (such as 20) and a feeding arrangement that feeds the weld-wire, in some cases at a wire speed of 600 inches per minute. Under the above assumed conditions, the welding operation is proceeding satisfactorily; and motor 20 maintains a constant speed that feeds the weld-wire forward at a satisfactory rate.

Assume now that the welding operation is temporarily out of control. Under these conditions, the weld-control signal from unit 10 no longer balances the reference signal from reference source 14; and therefore amplifier 12 produces an error signal that cause motor 20 to either accelerate or decelerate—depending upon conditions. As a result, the weld-wire is fed forward either faster or slower; thus correcting the unsatisfactory welding operation. In this way, the weld-control signal controls the welding operation.

It is well known that weld-wire feed units, such as 22, have their own inherent shortcomings. Depending upon the design of the unit, the weld-wire may buckle at the guides, may slip at the driving wheels; or the unit itself may have internal mechanical or frictional problems that produce a weld-wire feed that is not completely satisfactory or constant.

If, for these reasons or others, the weld-wire is not fed forward fast enough, the welding operation would tend to go out of control. Eventually, the sensor would produce a sensor signal; and this signal would adjust the speed of motor 20 to correct the situation. However, there is an undesirable timelag due to mechanical linkages, mechanical inertia, thermal inertia, and the like.

Applicants overcome this situation by driving a tachometer 24 by means of the weld-wire that is being emitted from feeding unit 22; tachometer 24 precisely measuring the instantaneous speed of the weld-wire. The output of tachometer 24 is an electrical feed signal that may be applied to another amplifier (not shown) and/or a variable scaling resistor 26; the feed signal from resistor 26 being composited, in a summing circuit 30, with the error signal traversing resistance 16.

The feed signal operates as follows. Assume a welding condition wherein the weld-wire binds. Under this assumed condition, tachometer 24 immediately produces a reduced magnitude feed signal—long before the sensor unit 10 produces a sensor signal. This feed signal immediately speeds up motor 20—in this way increasing the rate of weld-wire feed unit 22.

It will be noted that the error signal and the feed signal are composited for application to the motor amplifier 18; the circuit in this way combing combining the effects of the weld-control signal and the tachometer signal.

A heuristic numerical example will help clarify this operation. First of all, it should be noted that the error signal may be above or below the reference signal; and it will be assumed that the below-reference condition will produce a +10-volt positive error signal whereas the above-referenced condition will produce a −10-volt negative error signal. It will be assumed further that the +10-volt error signal will accelerate motor 20, thus increasing the weld-wire feed rate, and providing additional heat; whereas the −10-volt error signal will slow down motor 20, thus reducing the weld-wire feed rate, and cooling the welding operation. The quiescent error signal will be assumed to have a value of 0 volts.

It will also be assumed that tachometer 24 produces a −10-volt tachometer signal when the weld-wire feed rate is fast; and produces a +10-volt tachometer signal when the weld-wire feed rate is slow; the quiescent tachometer signal having a value of 0 volts.

Under the assumed condition wherein the weld-wire slows down, the feed signal from tachometer 24 increases to +10 volts; whereas the error signal remains—for the moment—at 0 volts. As a result, summing network 30 provides, at pickoff point 32, a composite power signal of +5 volts—(0+10)/2; and the accelerates motor 20. As motor 20 accelerates, so does the wire-feed mechanism 22; increasing the feed rate of the weld-wire—and the magnitude of the tachometer signal. Assume that the tachometer signal changes from its previous value of +10 volts to a new value of +8 volts; so that summing-network 30 now produces a lower magnitude composited power signal having a value of only +4 volts—(0+8)/2—which continues to accelerate the motor. This procedure is progressive; i.e., if the binding action remains, the motor speed is stabilized at a high rate that overcomes the frictional effect of the binding action. If, on the other hand, the weld-wire bind disappears, the tachometer signal returns the motor to its normal speed.

It was assumed during the above explanation that no error signal was produced; and this assumption would be true if the bind were of short duration. However, a longer duration bind would eventually produce a positive sensor signal, say +10 volts. Thus, the +10-volt error signal and the +8-volt feed signal would both be positive; and the summing network would produce a more-positive power signal having a value of +9 volts—(+10+8)/2. This power signal would accelerate the motor, and thus compensate for the binding action.

When the sensor signal indicates that the bind had been overcome, by producing a negative-polarity error signal, the summing network then produces a decelerating power signal; and the welding operation reverts to its quiescent state.

The above discussion has been presented in terms of a sensor signal obtained from sensor 10; and it was pointed out that sensor 10 could provide different types of sensor signals—i.e., infrared measurement, arc-voltage measurement, arc-length measurement, arc-current measurement, temperature measurement, etc. Any of these individual sensor signals may be used as discussed above; and, moreover, a plurality of such signals can be combined (at the summing network) in order to control the welding operation in accordance to the particular conditions that are being sensed.

It is well known that motors, such as 20, are designed to have a high acceleration and deceleration; and thus a fast response. The overall effect may not be entirely satisfactory. For example, under the influence of a positive "acceleration" power signal, motor 20 tends to accelerate very rapidly. However, it may now be impossible to slow it down when a subsequent power signal indicates that deceleration is desirable. As a result, motor 20 tends to "overshoot" each time it receives a different-polarity signal; the net result being a "hunting" for the proper operating speed.

In order to minimize this hunting effect, Applicants attach a motor tachometer 28 to motor 20; this second tachometer producing a motor signal that indicates the acceleration/deceleration of the motor. This motor signal acts in the above-described manner to prevent motor overshoot; and is applied through variable scaling resistance 34 to power amplifier 18—being composited in the summing network 30 with the error signal and the feed signal. In this way, the sensor, feed, and motor signals coact to compensate for disturbances in the welding operation.

The above discussion has been presented in terms of a summing network 30 having equal scaling resistors 16, 26, and 34; network 30 acting as a well-known voltage divider. It has been found advantageous to obtain an unusually fast response to the feed signal, and slow response to the motor signal. One easy way to achieve this result is to have the scaling resistors 26, 16, 34 assume values having a 1:2:4 ratio.

What is claimed is:

1. In a welding system having a weld-wire, a workpiece to be welded, means for melting the weld-wire onto the workpiece, including a means for feeding the weld-wire toward the workpiece, the improvement comprising:

means for sensing the temperature of said workpiece and producing a temperature signal indicative of the temperature being sensed;

means for sensing the feed-rate of said weld-wire and producing a feed-rate signal indicative of the feed rate being sensed;

means for adding said temperature signal and said feed-rate signal to produce a composite weld-control signal, and means for controlling said means for feeding the weld-wire in response to said composite weld-control signal to cause the welding temperature on said workpiece to be maintained substantially constant;

means for sensing the driving rate at which said means for feeding tends to drive said weld-wire and producing a driving signal indicative of the driving rate said feeding means tends to drive said weld-wire; and said adding means also adds said driving signal to the other two signals to cause said composite signal to be a combination of three signals.

2. In the combination of claim 1 wherein:

said feeding means comprises a motor for engaging said weld-wire to move the weld-wire; said means for sensing the driving rate at which said motor tends to move said weld-wire comprises a tachometer means for sensing the speed of said motor so that said driving signal is indicative of the speed of the motor.

* * * * *